United States Patent [19]

Chen

[11] Patent Number: 4,900,624
[45] Date of Patent: Feb. 13, 1990

[54] ADHESIVES AND TAPES INCLUDING SAME

[75] Inventor: Samuel J. Chen, Lexington, Mass.
[73] Assignee: Kendall Company, Lexington, Mass.
[21] Appl. No.: 30,756
[22] Filed: Mar. 25, 1987
[51] Int. Cl.$^4$ .......................... C09J 7/02; B32B 15/08
[52] U.S. Cl. ..................................... 428/343; 428/355; 428/457; 428/463; 526/304
[58] Field of Search ................ 525/301, 381; 526/304; 428/457, 343, 355, 463

[56] References Cited

U.S. PATENT DOCUMENTS

| | | | |
|---|---|---|---|
| 4,521,563 | 6/1985 | Lucas | 525/381 X |
| 4,522,973 | 6/1985 | Ley et al. | 526/304 X |
| 4,554,324 | 11/1985 | Husman et al. | 525/301 |

*Primary Examiner*—Thomas J. Herbert
*Attorney, Agent, or Firm*—Alvin Isaacs

[57] ABSTRACT

Novel adhesives for preparing metal foil adhesive tapes meeting Underwriter Laboratories requirements for use with rigid fiberglass air ducts, which adhesive comprises a copolymer of: (1) at least one activated ester-containing vinyl monomer of Formula I (as defined hereinafter); (2) at least one ethylenically unsaturated carboxylic acid containing 3-5 carbon atoms; (3) at least one acrylic or methacrylic acid ester of a non-tertiary alcohol having 1-14 carbon atoms; and (4) at least one vinyl ester of a saturated carboxylic acid, said polymer being crosslinked with a crosslinking agent reactive with the carboxylic acid moiety through its reactive hydrogen atom; and adhesive tapes prepared therefrom.

13 Claims, No Drawings

ADHESIVES AND TAPES INCLUDING SAME

This application is related to my application Ser. No. 019,832 filed Feb. 28, 1987, now abandoned.

BACKGROUND OF THE INVENTION

The present invention relates to novel adhesives and, more particularly, to novel adhesives which can be coated onto an aluminum backing material to provide so-called foil tapes which meet the very severe Underwriter Laboratories, Inc. (UL) 181A requirements and specifications for use with rigid fiberglass air ducts.

Foil tapes, e.g. pressure-sensitive or heat-bonded aluminum tapes are of course known in the art. It is also heretofore known to employ foil tapes for such purposes as closure systems for use with factory-made air ducts and connectors. However, recently UL has imposed very severe standards for this usage. Consequently, the primary task of this invention can be said to develop a novel aluminum (foil) tape which will meet the recent UL requirements and specifications, as detailed hereinafter, for the aforementioned usage.

| U.L. SPECIFICATIONS | |
|---|---|
| Test No. | Description |
| | Peel Adhesion |
| | Three samples from each of three separate rolls of tape cut in 1 inch (25.4 mm) wide by 12 inches (305 mm) long strips are to be tested. The tape samples are to be applied (as specified in ASTM D-3330-83) to a stainless steel panel with a mechanically operated roller weighing 10 pounds (4.53 kg.). The roller is to pass over each sample five times in each direction. The test load is to be applied 15 minutes after completion of the rolling. The average peel adhesion strength of each roll of aluminum tape shall be ≧ 3.75 lbs. (60 oz) per inch of width (0.66 N/mm) of tape, with no individual sample having a value ≦ 3.20 lbs (51.2 oz) per inch of width (0.56 N/mm). |
| | Shear Adhesion |
| | The shear adhesion strength of aluminum tape is to be determined in accordance with ASTM D-3654-82, as modified in the following description. One sample from each of four separate rolls are to be tested. Samples are to be cut in 1-inch (25.4 mm) wide by 6-inch (152 mm) long strips. The cut samples and specified stainless steel panels are to be maintained at the specified application conditions a minimum of one hour prior to applying samples to the panels. The tape is to be applied to the panel with a mechanically operated roller weighing 10 pounds-mass (4.53 kg). The roller is to pass each sample five times in each direction. Using a cutting gig or razor blade, the rolled portion of the sample is to be trimmed to a 1 inch by 1 inch square on the panel, such that the remaining test sample measures 1 inch by 5 inches. The tape is to be allowed to dwell on the panel for the specified time. After dwelling, the clamp is to be placed on the free end of the sample, insuring that the clamp extends completely across the width of the specimen and is aligned to uniformly distribute the load. The specified test load is then to be applied to the clamp gently so as not to cause any shear impact force on the sample. The load is to be applied for the specified test duration. The test panel is to be positioned at 2 degrees from the vertical so that the test substrate forms a 178° angle with the extended tape sample. Individual samples of the tape are to be tested in accordance with each of the conditions as set forth hereinbelow: |

| | Application Condition | Dwell Time | Test Condition | Test Load | Duration |
|---|---|---|---|---|---|
| 2. | 40° F. (4.4° C.) dry substrate | 15 minutes | 40° F. | 5 lbs. (22.2 N) | 6 hours |
| 3. | 73.4° F. (23° C.) 50% RH | 15 minutes | 73.4° F. | 5 lbs. | 6 hours |
| 4. | 73.4° F. (23° C.) 50% RH | 24 hours | 73.4° F. | 10 lbs. | 120 hours |
| 5. | 73.4° F. (23° C.) 50% RH | 15 minutes | 150° F. (65.6° C.) | 5 lbs. | 6 hours |

The shear adhesion strength of the tape (in each of the above tests) shall be such that the tape is able to maintain the test loads specified in the tests for the indicated test durations without evidence of separation or slippage in excess of 1/32 inch (0.79 mm).

The aforementioned tests (peel adhesion and shear adhesion) constitute the essential criteria which are critical to achieve in order to provide an aluminum tape meeting UL specifications for use with air ducts and connectors. However, for the sake of accuracy, it is to be noted that they are not the only tests which must be passed to satisfy UL specifications. One such test is a tensile strength test for the tape backing (foil). Another is peel adhesion at 20° angle. The former is not relevant to this invention and the latter will be met if the adhesive passes the five critical tests enumerated above.

Other UL criteria, specifically surface burning characteristics, mold growth and humidity tests, temperature/pressure cycling tests, burning test and manufacturing and production tests, as detailed in UL181A, are not difficult to meet and for purposes of a clear understanding of the nature and objects of this invention need not be described.

My aforementioned copending application, Ser. No. 019,832 (PF1040) is also directed to the task of providing an adhesive which can be employed for preparing metal foil adhesive tapes meeting UL specifications. In this copending application, the task is solved by providing an adhesive composition comprising a crosslinked copolymer of:

(1) at least one macromolecular monomer;

(2) at least one ethylenically unsaturated carboxylic acid containing 3–5 carbon atoms;

(3) at least one acrylic or methacrylic acid ester of a non-tertiary alcohol having 1–14 carbon atoms; and (4) at least one vinyl ester of a saturated carboxylic acid;

the tetrapolymer being crosslinked with a crosslinking agent reactive with said carboxylic acid moiety through its reactive hydrogen atom, the macromolecular monomer being a compound of the formula:

wherein R is lower alkyl, Z is a repeating monomeric unit selected from the group consisting of styrene, alpha(methylstyrene), isoprene, butadiene and mixtures thereof; n is a positive integer such that molecular weight is in the range from about 5,000 to about 50,000 and x is a polymerizable end group selected from the group consisting of:

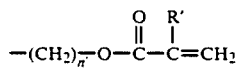

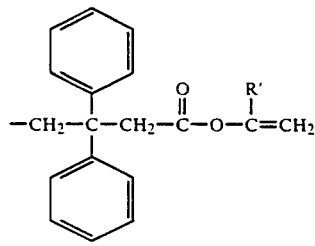

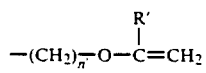

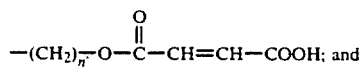

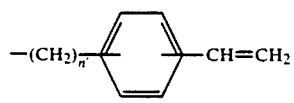

where n' is a positive integer from 1–4 and R' is alkyl having 1–4 carbon atoms.

The only commercially available macromolecular monomer of this description and hence of necessity the preferred one is 2-polystyrylethyl methacrylate which has been sold by Sartomer Company, a subsidiary of Atlantic Richfield under the name Chemlink ® 4500 Macromer ™ Monomer.

However, subsequent to the invention described and claimed in the aforementioned copending application, Applicant and his assignee, The Kendall Company, was advised that the Chemlink · ® Macromer would no longer be commercially available to them.

The task of the present invention can accordingly be described as being to prepare a metal foil tape meeting UL requirements which is not necessarily better than the invention in the earlier copending application, but which utilized readily obtainable starting materials.

BRIEF DESCRIPTION OF THE INVENTION

In accordance with the present invention, this task is solved by employing, in lieu of the aforementioned macromolecular monomers, as activated ester-containing vinyl monomer of the formula:

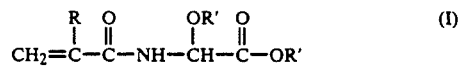

wherein R is hydrogen or methyl; and each R', which may be the same or different, is alkyl having 1–6 carbon atoms, cycloalkyl having 5–6 carbon atoms, or a 2-hydroxyalkyl having 2–6 carbon atoms.

The novel adhesives of this invention will comprise a copolymer of:

(1) at least one monomer of Formula (I);

(2) at least one ethylenically unsaturated carboxylic acid containing 3–5 carbon atoms;

(3) at least one acrylic or methacrylic acid ester of a non-tertiary alcohol having 1–14 carbon atoms; and (4) at least one vinyl ester of a saturated carboxylic acid; and then admixing with the thus formed polymer of a crosslinking agent reactive with the carboxylic acid moiety through its reactive hydrogen atom.

DETAILED DESCRIPTION OF THE INVENTION

As preciously mentioned, the present invention is directed to metal foil tapes meeting UL181A specifications for use with rigid fiberglass air ducts, which tapes comprise a metal foil backing carrying a novel adhesive which is a copolymer of:

(1) at least one activated ester-containing vinyl monomer of Formula I;

(2) at least one ethylenically unsaturated carboxylic acid containing 3–5 carbon atoms;

(3) at least one acrylic or methacrylic acid ester of a non-tertiary alcohol having 1–14 carbon atoms; and (4) at least one vinyl ester of a saturated carboxylic acid, said polymer being crosslinked with a crosslinking agent reactive with the carboxylic acid moiety through its reactive hydrogen atom.

Useful monomers of Formula I include methyl acrylamidoglycolate methyl ether (MAGME), ethyl acrylamidoglycolate ethyl ether, butyl acrylamidoglycolate butyl ether, methyl acrylamidoglycolate ethyl ether, and ethyl acrylamidoglycolate methyl ether.

The monomers of Formula I, including the aforementioned illustrative species, are known in the art and are described, for example, in U.S. Pat. No. 4,521,563 issued to Howard R. Lucas and assigned to American Cyanamid Company.

A preferred monomer of this description is:

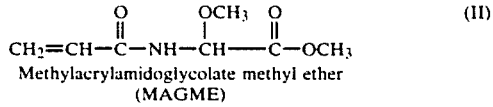

Methylacrylamidoglycolate methyl ether
(MAGME)

a white solid, melting point 70–73 ° C., available commercially in 95–97% purity from American Cyanamid Co. A preferred method of preparing MAGME is disclosed in U.S. Pat. No. 4,443,623 issued to James M. Photis and assigned to American Cyanamid Company.

As examples of useful ethylenically unsaturated carboxylic acids containing 3–5 carbon atoms, mention may be made of acrylic acid, methacrylic acid, itaconic acid, maleic acid and fumaric acid, acrylic acid being particularly preferred.

Useful acrylic or methacrylic acid esters of non-tertiary alcohols having 1–14 carbon atoms include those previously mentioned with reference to U.S. Pat. No. 4,554,324, i.e. 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol,2-octanol,1-decanol, 1-dodecanol as well as others. Preferred are acrylic acid esters of non-tertiary alcohols having 4–14 carbon atoms, e.g. butyl acrylate, amyl acrylate, decyl acrylate, lauryl acrylate, and the like, 2-ethylhexyl acrylate being particularly preferred.

Suitable vinyl esters are those wherein the acid contains 1–6 carbon atoms, e.g. vinyl acetate, vinyl propionate, vinyl butyrate, vinyl valerate, etc., vinyl acetate being particularly preferred.

Suitable crosslinking agents, i.e. crosslinkers reactive with the carboxylic acid moiety through its reactive hydrogen atom are per se known in the art and its selection will be within the expected judgment of the skilled worker in the light of the present disclosure.

Such per se known crosslinkers include aluminum acetylacetonate and alkylated amino crosslinkers of the "CYMEL" or "BEETLE" (Trademarks of American Cyanamide Co.) Series, highly alkylated melamines such as "CYMEL" 303 (understood to be hexamethoxymethyl melamine) being a particularly efficient one. Others may be readily suggested to those skilled in the art.

An important aspect of the present invention is the discovery that crosslinking in the described manner markedly increases the shear adhesion with a slighter "trade" or drop-off in peel adhesion. Accordingly, the non-crosslinked polymer should have sufficient initial adhesion to allow for a slight drop-off and still possess sufficient peel adhesion to meet UL specifications. Since the peel adhesion criteria is not as difficult to achieve as the shear adhesion, particularly shear adhesion meeting high temperature and long term criteria, this is not a significant problem in the selection of the monomers for copolymerization.

Nevertheless, because of this slight drop-off and further in view of varying efficiencies of selected crosslinking agents, it is not possible to state quantitatively the weight ratio of crosslinker which should be employed in the practice of this invention.

Functionally, it can be stated and will be understood that sufficient crosslinker should be employed to increase the shear adhesion to acceptable levels while at the same time not lowering the peel adhesion form initially acceptable levels to levels which are no longer acceptable.

By way of illustration, when employing aluminum acetylacetonate or CYMEL 303, levels on the order of 0.1 to 1.0 parts per 100 parts by weight of polymer are entirely acceptable.

The copolymers of this invention may be prepared by routine chemical synthesis within the expected judgment of those skilled in the art. Specifically, the monomeric components may be admixed and polymerization effected in the presence of the usual polymerization initiators, chain extenders, etc. The resulting copolymer (which may be regarded as an intermediate in the synthesis of the ultimate chemically crosslinked polymers of this invention) is then admixed with per se known crosslinkers for the carboxylic acid monomeric components, as heretofore discussed, to provided the desired polymeric adhesive. Sufficient crosslinking will occur during manufacture, e.g. solvent removal, to make the adhesive operative for meeting UL specifications. However, it has been determined that further crosslinking will occur over a period of time, particularly during shelf life at elevated temperatures.

By way of recapitulation, the novel adhesives of this invention meeting UL181A specifications for foil tapes for use with rigid fiberglass air ducts consist essentially of:

(1) at least one ester-containing vinyl monomer of Formula I;

(2) at least one ethylenically unsaturated carboxylic acid containing 3–5 carbon atoms;

(3) at least one acrylic or methacrylic acid ester of a non-tertiary alcohol having 1–14 carbon atoms; and (4) at least one vinyl ester of a saturated carboxylic acid, the polymer being crosslinked with a crosslinking agent reactive with the carboxylic acid moiety through its reactive hydrogen atom.

Critical to this invention is that foil tapes carrying a layer of this adhesive meet the aforementioned UL181A criteria. It follows a fortiori that the particular monomer employed, their amounts and the degree of crosslinking must all be selected so that the resulting crosslinked polymeric adhesive will meet UL181A criteria.

This will be treated as a critical limitation in the appended claims. Since it is not feasible to prepare and test all polymers within the above definition, it is to be expressly understood that those polymers which satisfy this condition are within the scope of the appended claims and, conversely, any adhesives which do not are not contemplated by this invention and accordingly are not within the scope of the appended claims.

In this context, with respect to amounts of the individual monomers which may be employed, the following ranges have been found operative:

(1) from about 5 to about 20 parts by weight of a monomer or mixture of monomers of Formula I;

(2) from about 3 to about 10 parts by weight of ethylenically unsaturated carboxylic acid;

(3) from about 70 to about 85 parts by weight of acrylic or methacrylic acid ester of a non-tertiary alcohol having 1–14 carbon atoms; and (4) from about 7 to about 22 parts by weight of vinyl ester of a saturated carboxylic acid.

However, it is envisioned that other ratios of particular monomers may possibly be employed to satisfy UL181A specifications.

Illustrative polymers which may be prepared for crosslinking in accordance with the practice of this invention to provide foil tapes meeting UL181A specifications are set forth in the following table.

TABLE 1

| NO. | 2-ETHYHEXYL ACRYLATE | MAGME | ACRYLIC ACID | VINYL ACETATE | HYDROXYETHYL ACRYLATE |
|---|---|---|---|---|---|
| 1. | 73.6 | 9.0 | 6.4 | 11.0 | — |
| 2. | 75.6 | 7.0 | 6.4 | 11.0 | — |
| 3. | 72.0 | 9.0 | 8.0 | 11.0 | — |
| 4. | 71.0 | 9.0 | 8.0 | 12.0 | — |
| 5. | 70.0 | 9.0 | 8.0 | 12.0 | 1.0 |
| 6. | 72.0 | 9.0 | 8.0 | 10.0 | 1.0 |
| 7. | 72.0 | 9.0 | 8.0 | 10.0 | 1.0 |
| 8. | 70.0 | 9.0 | 8.0 | 11.5 | 1.5 |
| 9. | 72.5 | 4.5 | 8.0 | 12.0 | 3.0 |
| 10. | 71.0 | 4.5 | 8.0 | 12.0 | 4.5 |
| 11. | 71.0 | 3.0 | 8.0 | 12.0 | 6.0 |

The polymers listed in Table 1 may be crosslinked with a suitable crosslinker for the acrylic acid moiety as heretofore described, e.g. aluminum acetylacetonate or CYMEL 303.

It should be noted, however, that although accelerating aging criteria are not a requirement of UL181A, they are nevertheless very useful from a manufacturing standpoint as a benchmark for determining shelf life stability of a product. Accelerating aging studies indicate that the polymers containing hydroxyethyl acrylate have reduced shelf life. Consequently, absent the incorporation of a stabilizing system, polymers containing this monomer would not appear to be good candidates from a commercial standpoint, due to reduced shelf life.

The following examples show by way of illustration and not by way of limitation the practice of this invention.

EXAMPLE 1

The polymerization was carried out in a glass reaction kettle equipped with a reflux condenser, mechanical stirrer and two graduated dropping funnels attached to metering pumps. To the reaction kettle was placed about 9.135 parts by weight of 2-ethylhexyl acrylate, 1.116 parts of MAGME, 0.792 parts of acrylic acid and 1.366 parts of vinyl acetate (approximately 25% of the monomer mixture), along with 0.779 parts of toluene (as molecular weight regulator or chain transfer agent), 0.111 parts of "Lupersol PMS" (trademark of Pennwalt Corporation for a polymerization initiator, 1-butyperoxy-2-ethylhexanoate) and 15.851 parts of ethyl acetate (solvent). The reaction kettle was purged with nitrogen and heated at 75° C. (+2° C.) for about one hour. The remaining 75% of the monomer mix, namely 27.406 parts of 2-ethylhexyl acrylate, 3.347 parts of MAGME, 2.378 parts of acrylic acid and 4.098 parts of vinyl acetate were meanwhile added to 24.471 parts of ethyl acetate and premixed to a homogenous state. This premix was added to the reaction kettle over a period of about 1¾ hours. Simultaneously, 0.222 parts of azobisisobutyronitrile (initiator) in 7.647 parts of ethylacetate were added at a constant rate over a period of about 1¼ hour. The monomer and initiator additions were at a sufficient rate to raise the reaction temperature exceeding 75° C. after about 30 minutes. An exothermic reaction resulted with the maximum temperature exceeding 75° C., thus requiring external cooling. After maintaining the temperature around 75° for one hour, 0.028 additional parts of azobisisobutyronitrile in 1.251 parts of ethyl acetate were added. The reaction mixture was then maintained at about 75° C. for an additional two hours and then cooled to room temperature to yield the tetrapolymer of Formula I (in Table I), in the following approximate proportions: 73.6 2-ethylhexyl acrylate/9.0 MAGME/6.4 acrylic acid/11.0 vinyl acetate (96–99% monomer conversion), molecular weight=270,000–325,000; Mn=46,000–73,000; MWD=5.5–7.0.

EXAMPLES 2-11

In a similar manner, the copolymers of Formulae 2-11 were prepared.

EXAMPLE 12

0.5 parts of aluminum acetylacetonate per 100 parts by weight of polymer were added to the reaction mixture of Example 1 followed by stirring with a mechanical stirrer at room temperature to provide the crosslinked polymeric adhesive.

EXAMPLES 13-16

In a similar manner, Formulae 2-5, selected as model candidates, were crosslinked with varying amounts of CYMEL 303 or aluminum acetylacetonate, as detailed hereinafter in Table 2.

Aluminum foil tapes were prepared from each of the crosslinked adhesives of Example 12-16, i.e the crosslinked copolymers of formulae 12-16. In addition, aluminum tapes were prepared from certain of the non-crosslinked copolymers to serve as controls. In each instance the adhesive was cast onto the backing material at a thickness of about 1.5 mils.

With respect to the thickness of the adhesive, it is to be noted that the present invention permits the use of significantly thinner adhesive coatings than those employed in the practice of the invention described and claimed in the aforementioned copending application, Ser. No. 019,832, (PF1040). For instance, in the illustrative examples in the copending application, thicknesses on the order of 2.3–2.5 mils were employed a compared with the 1.5 mils in the instant illustrative examples, a reduction in thickness of about 35–40% resulting in a significant cost saving in the manufacture along with a corresponding reduction in diameter and weight of a roll of tape of a given length.

With the exception of Formula 1, each of the resulting foil tapes was submitted to UL181A tests 1, 4 and 5 as previously described in detail. Tests 2 and 3 were not performed simply as a matter of expediency since they are not necessary for purposes of evaluation.

In this context, it is well understood in the art that Shear Tests 4 (long term) and 5 (high temperature) are the most critical and that if an adhesive tape passes these tests, it will easily pass shear test 2 and 3, as well. Of course, the converse is not true so that passage of tests 2 and 3 does not imply passage of 4 and 5.

Since increasing the shear adhesion in accordance with this invention typically results in some lowering of the peel adhesion, as previously discussed, it is still most advisable, if not essential, also to perform Peel Adhesion Test 1, to assure acceptability of the model candidate.

In any event, Applicant can state unequivocally, based upon his knowledge of testing adhesives in general and specifically in view of his observation in the aforementioned related application Ser. No. 019,832, (PF1040) that Tests 2 and 3 can in fact be eliminated to expedite ascertainment of whether or not a particular candidate meets UL181A specifications.

The results of these tests are set forth in Table 2.

TABLE 2

| UL181A Specifications TEST COPOLYMERS FORMULA NO. | *MEL | **AAA | TEST 1 PEEL >60 oz. | TEST 2 SHEAR (low temp.) >6 hrs. | TEST 3 SHEAR (short term) >6 hrs. | TEST 4 SHEAR (long term) >120 hrs. | TEST SHEAR (high temp.) >6 hrs. |
|---|---|---|---|---|---|---|---|
| 1 | — | — | 80.0 | | | 110.0 | 2.4 |
| 1 | | 0.5 | 75.0 | >200 | >200 | >120 | >200 |
| 1 | | 0.3 | 80.6 | >200 | >200 | >150 | >143 |
| 2 | | 0.3 | 66.5 | | | >300 | 20.0 |
| 3 | — | — | 68.4 | | | >260 | 5.9 |
| 4 | — | — | 84.5 | | | >312 | 2.62 |
| 4 | 0.5 | | 80.9 | | | >144 | >100 |
| 4 | — | 0.1 | 74.2 | | | >120 | >145 |
| 5 | — | — | 89.0 | | | >260 | 7.3 |
| 5 | 1.0 | | 79.0 | | | >200 | >100 |
| 5 | 0.5 | | 80.0 | | | >176 | >120 |
| 5 | 0.75 | | 74.2 | | | >120 | >145 |

In the above Table, the "greater than" (>) sign means that the test was stopped after the indicated passage of time. It accordingly does not imply that the recited figures are the upper limits before failure. The remaining data indicate the time at which failure occurred.

As mentioned earlier, the copolymer of Formula 1, crosslinked with 0.5 and 0.3 parts of crosslinker (as shown in Table 2) was, in each instance, submitted to the low temperature and short term Shear Adhesion Tests 2 and 3. In each instance, no failure way evidenced after 200 hours when the tests were terminated.

Since certain changes may be made without departing from the scope of the invention herein described, it is intended that all matter contained in the foregoing description, including the examples, shall be taken as illustrative and not in a limiting sense.

What is claimed is:

1. A metal foil tape meeting Underwriters Laboratories criteria for use with rigid fiberglass air ducts, said tape comprising a metal foil backing sheet carrying a layer of an adhesive composition comprising a crosslinked copolymer of:
   (1) an activated ester-containing vinyl monomer of the formula:

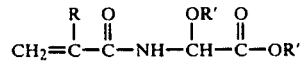

wherein R is hydrogen or methyl; and R' is alkyl having one to six carbon atoms, or 2-hydroxyalkyl having two to six carbon atoms;
   (2) at least one ethylenically unsaturated carboxylic acid containing 3–5 carbon atoms;
   (3) at least one acrylic or methacrylic acid ester of a non-tertiary alcohol having 1–14 carbon atoms; and
   (4) at least one vinyl ester of a saturated carboxylic acid.

2. A metal foil tape as defined in claim 1 wherein said vinyl monomer is methyl acrylamidoglycolate ethyl ether.

3. A metal foil tape as defined in claim 1 wherein said ethylenically unsaturated carboxylic acid is selected from the group consisting of acrylic acid, methacrylic acid, itaconic acid, maleic acid and fumaric acid./

4. A metal foil tape as defined in claim 1 wherein said non-tertiary alcohol is selected from the group consisting of 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1-pentanol, 2-ethyl-1-butanol, 2-ethyl-1-hexanol, 3,5,5-trimethyl-1-hexanol, 3-heptano,2-octanol,1-decanol and 1-dodecanol.

5. A metal foil tape as defined in claim 1 wherein said vinyl ester is selected from the group consisting of vinyl acetate, vinyl propionate, vinyl butyrate and vinyl valerate.

6. A metal foil tape as defined in claim 1 wherein said copolymer is crosslinked with a melamine resin or aluminum acetylacetonate crosslinking agent.

7. A metal foil tape meeting Underwriter Laboratories criteria for use with rigid fiberglass air ducts, said tape comprising a metal foil backing sheet carrying a layer of an adhesive composition comprising a crosslinked copolymer of:
   (1) from about 3 to about 20 parts by weight of an activated ester-containing vinyl monomer of the formula:

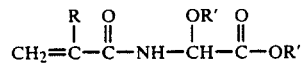

wherein R is hydrogen or methyl; and R' is alkyl having one to six carbon atoms, or 2-hydroxyalkyl having two to six carbon atoms;
   (2) from about 3 to about 10 parts by weight of at least one ethylenically unsaturated carboxylic acid selected from the group consisting of acrylic acid, methacrylic acid, itaconic acid, maleic acid and fumaric acid;
   (3) from about 70 to about 85 parts by weight of at least one acrylic or methacrylic acid ester of a non-tertiary alcohol having 1 to 14 carbon atoms selected from the group consisting of 1-butanol, 1-pentanol, 2-pentanol, 3-pentanol, 2-methyl-1-butanol, 2-ethyl-1-hexanol, 1-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol and 1-dodecanol; and (4) from about 7 to about 22 parts by weight of at least one vinyl ester of a saturated carboxylic acid selected from the group consisting of vinyl acetate, vinyl propionate, vinyl butyrate and vinyl valerate; said copolymer being crosslinked with a crosslinking agent reactive with said carboxylic acid moiety through its are reactive hydrogen atom.

8. A metal foil tape as defined in claim 7 wherein said vinyl monomer is methyl acrylamidoglycolate ethyl ether.

9. A metal foil tape as defined in claim 8 wherein said carboxylic acid is acrylic acid.

10. A metal foil tape as defined in claim 9 wherein said acrylic acid or methacrylic acid ester is 2-ethylhexyl acrylate.

11. A metal foil tape as defined in claim 10 wherein said vinyl ester is vinyl acetate.

12. An adhesive tape comprising a backing sheet material carrying a layer of an adhesive composition adapted for meeting Underwriters Laboratories specifications for metal foil adhesive tapes for use with rigid fiberglass air ducts, said composition comprising a copolymer of:

(1) an activated ester-containing vinyl monomer of the formula:

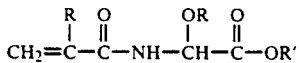

wherein R is hydrogen or methyl; and R' is alkyl having one to six carbon atoms, or 2-hydroxyalkyl having two to six carbon atoms;

(2) at least one ethylenically unsaturated carboxylic acid containing 3-5 carbon atoms;

(3) at least one acrylic or methacrylic acid ester of a non-tertiary alcohol having 1-14 carbon atoms and;

(4) at least one vinyl ester of a saturated carboxylic acid;

said polymer being crosslinked with a crosslinking agent reactive with the carboxylic acid moiety through its reactive hydrogen atom.

13. An adhesive tape comprising a backing sheet material carrying a layer of an adhesive composition adapted for meeting Underwriters Laboratories specifications for metal foil adhesive tapes for use with rigid fiberglass air ducts, said composition comprising a copolymer of:

(1) from about 3 to about 20 parts by weight of an activated ester-containing vinyl monomer of the formula:

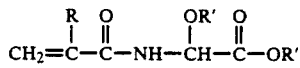

wherein R is hydrogen or methyl; and R' is alkyl having one to six carbon atoms, or 2-hydroalkyl having two to six carbon atoms;

(2) from about 3 to about 10 parts by weight of at least one ethylenically unsaturated carboxylic acid selected from the group consisting of acrylic acid, methacrylic acid, itaconic acid, maleic acid and fumaric acid;

(3) from about 70 to about 85 by weight of at least on acrylic or methacrylic acid ester of a non-tertiary alcohol having 1 to 14 carbon atoms selected from the group consisting of 1-butanol, 1-pentanol, 2-pentanol, 3-pentanol, 2-methyl-1-butanol, 2-ethyl-1-hexanol, 1-methyl-1-pentanol, 3-methyl-1pentanol, 2-ethyl-1-butanol, 3,5,5-trimethyl-1-hexanol, 3-heptanol, 2-octanol, 1-decanol and 1-dodecanol; and (4) from about 7 to about 22 parts by weight of at least one vinyl ester of a saturated carboxylic acid selected from the group consisting of vinyl acetate, vinyl propionate, vinyl butyrate and vinyl valerate; said copolymer being crosslinked with a crosslinking agent reactive with said carboxylic acid moiety through its are reactive hydrogen atom.

* * * * *